(12) United States Patent
Blum et al.

(10) Patent No.: US 7,971,994 B2
(45) Date of Patent: Jul. 5, 2011

(54) ELECTRO-ACTIVE SPECTACLE LENSES

(75) Inventors: Ronald D. Blum, Roanoke, VA (US);
Joshua N. Haddock, Roanoke, VA (US);
Dwight P. Duston, Laguna Niguel, CA (US)

(73) Assignee: PixelOptics, Inc., Roanoke, VA (US)

( * ) Notice: Subject to any disclaimer, the term of this patent is extended or adjusted under 35 U.S.C. 154(b) by 0 days.

(21) Appl. No.: 12/350,983

(22) Filed: Jan. 9, 2009

(65) Prior Publication Data
US 2009/0115961 A1    May 7, 2009

Related U.S. Application Data

(63) Continuation of application No. 11/808,555, filed on Jun. 11, 2007, now Pat. No. 7,527,375.

(60) Provisional application No. 60/815,870, filed on Jun. 23, 2006.

(51) Int. Cl.
*G02C 1/00*     (2006.01)
*G02C 7/02*     (2006.01)
*G03B 35/02*    (2006.01)

(52) U.S. Cl. ........ 351/158; 351/159; 351/168; 351/169; 352/62; 352/63; 352/85; 345/7; 345/8; 348/42

(58) Field of Classification Search ................ 351/158, 351/159, 153, 168, 169, 172, 177, 200; 359/464–466, 469; 600/27, 545, 546, 549; 353/7; 345/7–9; 352/62, 63, 85; 348/42, 348/49, 51, 53–56, E13.037, E13.04; 349/11, 349/13, 15

See application file for complete search history.

(56) References Cited

U.S. PATENT DOCUMENTS

| | | | |
|---|---|---|---|
| 2,437,642 A | 3/1948 | Henroleau |
| 2,576,581 A | 11/1951 | Edwards |
| 3,161,718 A | 12/1964 | De Luca |
| 3,245,315 A | 4/1966 | Marks et al. |
| 3,309,162 A | 3/1967 | Kosanke et at |
| 3,614,215 A | 10/1971 | Mackta |
| 3,738,734 A | 6/1973 | Tait et al. |
| 3,791,719 A | 2/1974 | Kratzer et al. |
| 4,062,629 A | 12/1977 | Winthrop |
| 4,152,846 A | 5/1979 | Witt |
| 4,174,156 A | 11/1979 | Glorieux |
| 4,181,408 A | 1/1980 | Senders |
| 4,190,330 A | 2/1980 | Berreman |

(Continued)

FOREIGN PATENT DOCUMENTS

CN     ROC89113088     7/1987

(Continued)

OTHER PUBLICATIONS

Kovvel, Stephen T., et. al; Focusing by electrical modulation of refraction in a liquid crystal cell; Applied Optics; Jan. 15, 1984; vol. 23, No. 2.

(Continued)

*Primary Examiner* — Loha Ben
(74) *Attorney, Agent, or Firm* — Kilpatrick Townsend & Stockton LLP

(57) ABSTRACT

An adapter for a spectacle frame is disclosed which is configured for enabling the spectacle frame to operate and control electro-active lenses housed therein. In particular, the spectacle frame may allow electro-active lenses housed therein to focus and be controlled both automatically and manually with heretofore unrealized results.

22 Claims, 7 Drawing Sheets

U.S. PATENT DOCUMENTS

| | | | |
|---|---|---|---|
| 4,264,154 A | 4/1981 | Petersen | |
| 4,279,474 A | 7/1981 | Belgorod | |
| 4,300,818 A | 11/1981 | Schachar | |
| 4,373,218 A | 2/1983 | Schachar | |
| 4,395,736 A | 7/1983 | Fraleux | |
| 4,418,990 A | 12/1983 | Gerber | |
| 4,423,929 A | 1/1984 | Gomi | |
| 4,457,585 A | 7/1984 | DuCorday | |
| 4,461,550 A | 7/1984 | Legendre | |
| 4,466,703 A | 8/1984 | Nishimoto | |
| 4,466,706 A | 8/1984 | Lamothe, II | |
| 4,529,268 A | 7/1985 | Brown | |
| 4,537,479 A | 8/1985 | Shinohara et al. | |
| 4,564,267 A | 1/1986 | Nishimoto | |
| 4,572,616 A | 2/1986 | Kowel et al. | |
| 4,577,928 A | 3/1986 | Brown | |
| 4,601,545 A | 7/1986 | Kern | |
| 4,609,824 A | 9/1986 | Munier et al. | |
| 4,712,870 A | 12/1987 | Robinson et al. | |
| 4,751,691 A | 6/1988 | Perera | |
| 4,756,605 A | 7/1988 | Okada et al. | |
| 4,772,094 A | 9/1988 | Sheiman | |
| D298,250 S | 10/1988 | Kildall | |
| 4,787,733 A | 11/1988 | Silva | |
| 4,787,903 A | 11/1988 | Grendahl | |
| 4,795,248 A | 1/1989 | Okada et al. | |
| 4,813,777 A | 3/1989 | Rainville et al. | |
| 4,818,095 A | 4/1989 | Takeuchi | |
| 4,836,652 A | 6/1989 | Oishi et al. | |
| 4,842,400 A | 6/1989 | Klein | |
| 4,880,300 A | 11/1989 | Payner et al. | |
| 4,890,903 A | 1/1990 | Treisman et al. | |
| 4,904,063 A | 2/1990 | Okada et al. | |
| 4,907,860 A * | 3/1990 | Noble | 349/15 |
| 4,909,626 A | 3/1990 | Purvis et al. | |
| 4,919,520 A | 4/1990 | Okada et al. | |
| 4,921,728 A | 5/1990 | Takiguchi | |
| 4,927,241 A | 5/1990 | Kuijk | |
| 4,929,865 A | 5/1990 | Blum | |
| 4,930,884 A | 6/1990 | Tichenor et al. | |
| 4,944,584 A | 7/1990 | Maeda et al. | |
| 4,945,242 A | 7/1990 | Berger et al. | |
| 4,952,788 A | 8/1990 | Berger et al. | |
| 4,955,712 A | 9/1990 | Barth et al. | |
| 4,958,907 A | 9/1990 | Davis | |
| 4,961,639 A | 10/1990 | Lazarus | |
| 4,967,268 A | 10/1990 | Lipton et al. | |
| 4,968,127 A | 11/1990 | Russell et al. | |
| 4,981,342 A | 1/1991 | Fiala | |
| 4,991,951 A | 2/1991 | Mizuno et al. | |
| 5,015,086 A | 5/1991 | Okaue et al. | |
| 5,030,882 A | 7/1991 | Solero | |
| 5,050,981 A | 9/1991 | Roffman | |
| 5,066,301 A | 11/1991 | Wiley | |
| 5,067,795 A | 11/1991 | Senatore | |
| 5,073,021 A | 12/1991 | Marron | |
| 5,076,665 A | 12/1991 | Petersen | |
| 5,089,023 A | 2/1992 | Swanson | |
| 5,091,801 A | 2/1992 | Ebstein | |
| 5,108,169 A | 4/1992 | Mandell | |
| 5,114,628 A | 5/1992 | Hofer et al. | |
| 5,130,856 A | 7/1992 | Tichenor et al. | |
| 5,142,411 A | 8/1992 | Fiala | |
| 5,150,234 A | 9/1992 | Takahashi et al. | |
| 5,171,266 A | 12/1992 | Wiley et al. | |
| 5,182,585 A * | 1/1993 | Stoner | 351/41 |
| 5,184,156 A | 2/1993 | Black et al. | |
| 5,200,859 A | 4/1993 | Payner et al. | |
| 5,208,688 A | 5/1993 | Fergason et al. | |
| 5,229,797 A | 7/1993 | Futhey et al. | |
| 5,229,885 A | 7/1993 | Quaglia | |
| 5,231,430 A | 7/1993 | Kohayakawa | |
| 5,239,412 A | 8/1993 | Naka et al. | |
| D342,063 S | 12/1993 | Howitt et al. | |
| 5,305,028 A | 4/1994 | Okano | |
| 5,306,926 A | 4/1994 | Yonemoto | |
| 5,324,930 A | 6/1994 | Jech, Jr. | |
| D350,342 S | 9/1994 | Sack | |
| 5,352,886 A | 10/1994 | Kane | |
| 5,359,444 A | 10/1994 | Piosenka et al. | |
| 5,375,006 A | 12/1994 | Haas | |
| 5,382,986 A | 1/1995 | Black et al. | |
| 5,386,308 A | 1/1995 | Michel et al. | |
| 5,424,927 A | 6/1995 | Schaller et al. | |
| 5,440,357 A | 8/1995 | Quaglia | |
| 5,443,506 A | 8/1995 | Garabet | |
| 5,451,766 A | 9/1995 | Van Berkel | |
| 5,459,533 A | 10/1995 | McCooeye et al. | |
| 5,463,428 A | 10/1995 | Lipton et al. | |
| 5,488,439 A | 1/1996 | Weltmann | |
| 5,522,323 A | 6/1996 | Richard | |
| 5,552,841 A | 9/1996 | Gallorini et al. | |
| 5,606,363 A * | 2/1997 | Songer | 348/49 |
| 5,608,567 A | 3/1997 | Grupp | |
| 5,615,588 A | 4/1997 | Gottschald | |
| 5,654,786 A | 8/1997 | Bylander | |
| 5,668,620 A | 9/1997 | Kurtin et al. | |
| 5,682,223 A | 10/1997 | Menezes et al. | |
| 5,683,457 A | 11/1997 | Gupta et al. | |
| RE35,691 E | 12/1997 | Theirl et al. | |
| 5,710,615 A | 1/1998 | Kitani | |
| 5,712,721 A | 1/1998 | Large | |
| 5,717,412 A * | 2/1998 | Edwards | 345/7 |
| 5,728,155 A | 3/1998 | Anello et al. | |
| 5,739,959 A | 4/1998 | Quaglia | |
| 5,777,719 A | 7/1998 | Williams et al. | |
| 5,815,233 A | 9/1998 | Morokawa et al. | |
| 5,815,239 A | 9/1998 | Chapman et al. | |
| 5,861,936 A | 1/1999 | Sorensen | |
| 5,877,876 A | 3/1999 | Birdwell | |
| 5,900,720 A | 5/1999 | Kallman et al. | |
| 5,949,521 A | 9/1999 | Williams et al. | |
| 5,953,098 A | 9/1999 | Lieberman et al. | |
| 5,956,183 A | 9/1999 | Epstein et al. | |
| 5,963,300 A | 10/1999 | Horwitz | |
| 5,971,540 A | 10/1999 | Ofner | |
| 5,980,037 A | 11/1999 | Conway | |
| 5,999,328 A | 12/1999 | Kurtin et al. | |
| 6,040,947 A | 3/2000 | Kurtin et al. | |
| 6,050,687 A | 4/2000 | Bille et al. | |
| 6,057,811 A * | 5/2000 | Edwards | 345/8 |
| 6,069,742 A | 5/2000 | Silver | |
| 6,086,203 A | 7/2000 | Blum et al. | |
| 6,086,204 A | 7/2000 | Magnante | |
| 6,095,651 A | 8/2000 | Williams et al. | |
| 6,099,117 A | 8/2000 | Gregory | |
| 6,115,177 A | 9/2000 | Vossler | |
| 6,145,987 A | 11/2000 | Baude et al. | |
| 6,188,525 B1 | 2/2001 | Silver | |
| 6,191,881 B1 | 2/2001 | Tajima | |
| 6,213,602 B1 | 4/2001 | Smarto | |
| 6,270,220 B1 | 8/2001 | Keren | |
| 6,271,915 B1 | 8/2001 | Frey et al. | |
| 6,305,802 B1 | 10/2001 | Roffman et al. | |
| 6,325,508 B1 | 12/2001 | Decreton et al. | |
| 6,350,031 B1 | 2/2002 | Lashkari et al. | |
| 6,390,623 B1 | 5/2002 | Kokonaski et al. | |
| 6,396,622 B1 | 5/2002 | Alden | |
| 6,437,762 B1 | 8/2002 | Birdwell | |
| 6,437,925 B1 | 8/2002 | Nishioka | |
| 6,464,363 B1 | 10/2002 | Nishioka et al. | |
| 6,491,394 B1 | 12/2002 | Blum et al. | |
| 6,501,443 B1 | 12/2002 | McMahon | |
| 6,554,425 B1 | 4/2003 | Roffman et al. | |
| 6,607,271 B2 | 8/2003 | Bar et al. | |
| 6,609,794 B2 | 8/2003 | Levine | |
| 6,614,408 B1 | 9/2003 | Mann | |
| 6,616,275 B1 | 9/2003 | Dick et al. | |
| 6,616,279 B1 | 9/2003 | Davis et al. | |
| 6,618,208 B1 | 9/2003 | Silver | |
| 6,619,799 B1 * | 9/2003 | Blum et al. | 351/168 |
| 6,626,532 B1 | 9/2003 | Nishioka et al. | |
| 6,631,001 B2 | 10/2003 | Kuiseko | |
| 6,682,195 B2 | 1/2004 | Dreher | |
| 6,709,105 B2 | 3/2004 | Menezes | |
| 6,709,108 B2 | 3/2004 | Levine et al. | |
| 6,733,130 B2 * | 5/2004 | Blum et al. | 351/216 |

| | | |
|---|---|---|
| 6,738,199 B2 | 5/2004 | Nishioka |
| 6,768,536 B2 | 7/2004 | Okuwaki et al. |
| 6,774,871 B2 | 8/2004 | Birdwell |
| 6,778,246 B2 | 8/2004 | Sun et al. |
| 6,833,938 B2 | 12/2004 | Nishioka |
| 6,840,619 B2 | 1/2005 | Dreher |
| 6,851,805 B2 | 2/2005 | Blum et al. |
| 6,857,741 B2* | 2/2005 | Blum et al. ............ 351/168 |
| 6,871,951 B2 | 3/2005 | Blum et al. |
| 6,883,916 B2 | 4/2005 | Menezes |
| 6,886,938 B1 | 5/2005 | Menezes |
| 6,893,124 B1 | 5/2005 | Kurtin |
| 6,918,670 B2* | 7/2005 | Blum et al. ............ 351/159 |
| 6,948,818 B2 | 9/2005 | Williams et al. |
| 6,951,391 B2 | 10/2005 | Morris et al. |
| 6,955,433 B1 | 10/2005 | Wooley et al. |
| 6,956,682 B2 | 10/2005 | Wooley |
| 6,986,579 B2 | 1/2006 | Blum et al. |
| 7,008,054 B1 | 3/2006 | Kurtin et al. |
| 7,009,757 B2 | 3/2006 | Nishioka et al. |
| 7,018,040 B2 | 3/2006 | Blum et al. |
| 7,019,890 B2* | 3/2006 | Meredith et al. ............ 359/298 |
| 7,023,594 B2 | 4/2006 | Blum et al. |
| 7,030,902 B2* | 4/2006 | Jacobs ............ 348/42 |
| 7,041,133 B1 | 5/2006 | Azar |
| 7,085,065 B2 | 8/2006 | Silver |
| 7,090,348 B2 | 8/2006 | Nason et al. |
| 7,133,172 B2 | 11/2006 | Nishioka |
| 7,159,983 B2 | 1/2007 | Menezes et al. |
| 7,188,948 B2* | 3/2007 | Blum et al. ............ 351/159 |
| 7,218,339 B2* | 5/2007 | Jacobs ............ 348/42 |
| 7,229,173 B2 | 6/2007 | Menezes et al. |
| 7,290,875 B2 | 11/2007 | Blum et al. |
| 7,396,126 B2 | 7/2008 | Blum et al. |
| 7,404,536 B2 | 7/2008 | Blum et al. |
| 7,405,801 B2* | 7/2008 | Jacobs ............ 352/85 |
| 7,475,984 B2 | 1/2009 | Blum et al. |
| 7,508,485 B2* | 3/2009 | Jacobs et al. ............ 352/62 |
| 7,522,257 B2* | 4/2009 | Jacobs et al. ............ 352/62 |
| 7,604,349 B2* | 10/2009 | Blum et al. ............ 351/169 |
| 2001/0043266 A1 | 11/2001 | Robinson et al. |
| 2002/0140899 A1 | 10/2002 | Blum et al. |
| 2002/0149739 A1 | 10/2002 | Perrott et al. |
| 2002/0186346 A1 | 12/2002 | Stantz et al. |
| 2003/0018383 A1 | 1/2003 | Azar |
| 2003/0058406 A1 | 3/2003 | Blum et al. |
| 2003/0151721 A1 | 8/2003 | Lai et al. |
| 2003/0210377 A1 | 11/2003 | Blum et al. |
| 2004/0008319 A1 | 1/2004 | Lai et al. |
| 2004/0108971 A1 | 6/2004 | Waldern et al. |
| 2004/0117011 A1 | 6/2004 | Aharoni et al. |
| 2004/0130677 A1 | 7/2004 | Liang et al. |
| 2004/0179280 A1 | 9/2004 | Nishioka |
| 2004/0196435 A1 | 10/2004 | Dick et al. |
| 2004/0246440 A1 | 12/2004 | Andino et al. |
| 2005/0073739 A1 | 4/2005 | Meredith |
| 2005/0124983 A1 | 6/2005 | Frey et al. |
| 2006/0044510 A1 | 3/2006 | Williams et al. |
| 2007/0159562 A1 | 7/2007 | Haddock et al. |
| 2007/0258039 A1 | 11/2007 | Duston et al. |

FOREIGN PATENT DOCUMENTS

| | | |
|---|---|---|
| DE | 4223395 | 1/1994 |
| EP | 0 027 339 | 4/1981 |
| EP | 0154962 A2 | 9/1985 |
| EP | 0 225 034 | 6/1987 |
| EP | 0233104 A1 | 8/1987 |
| EP | 0237365 A1 | 9/1987 |
| EP | 0 308 705 | 3/1989 |
| EP | 0 578 833 | 1/1994 |
| EP | 0 649 044 | 4/1995 |
| GB | 2170613 A | 8/1986 |
| GB | 2169417 A | 7/1987 |
| JP | 55-076323 | 6/1980 |
| JP | 61 156227 | 7/1986 |
| JP | 61 177429 | 8/1986 |
| JP | 1 237610 | 9/1989 |
| JP | 05-100201 | 4/1993 |
| JP | 11352445 | 12/1998 |
| WO | WO-92/01417 | 2/1992 |
| WO | WO-98/27863 | 7/1998 |
| WO | WO-99/27334 | 6/1999 |
| WO | WO-03/050472 A1 | 6/2003 |
| WO | WO-03/068059 A2 | 8/2003 |
| WO | WO-2004/008189 A1 | 1/2004 |
| WO | WO-2004/015481 A1 | 2/2004 |
| WO | WO-2004/034095 A2 | 4/2004 |
| WO | WO-2004/072687 A2 | 8/2004 |

OTHER PUBLICATIONS

Thibos, Larry N., et al.; Vision through a liquid-crystal spatial light modulator; Adaptive Optics Conference; .1999; Durham, UK.

Miller, Donald T., et al.; Requirements for Segmented Spatial Light Modulators For Diffraction-Limited Imaging Through Aberrated Eyes, Adaptive Optics Conference.

Thibos, Larry N., et. al.; Use of Liquid-Crystal Adaptive-Optics to Alter the Refractive State of the Eye; Optometry and Vision Science; Jul. 1997; vol. 74, No. 7; American Academy of Optometry.

Thibos, Larry N., et al.; Electronic Spectacles for the 21$^{st}$ Century, Indian Journal of Optometry, Spring 1999; vol. 2, No. 1.

Bradley, Arthur; Profile: Larry N. Thibos, PhD., and Donald T. Miller, PhD.; Indiana Journal of Optometry; Spring 1999; vol. 2, No. 1.

Naumov, A.F.; Control Optimization of Spherical Modal Liquid Crystal Lenses; Optics Express, Apr. 26, 1999; vol. 4, No. 9; Optical Society of America.

Naumov, A.F.; Liquid Crystal Adaptive Lenses with Modal Control; Optics Letters, Jul. 1, 1998, vol. 23, No. 13; Optical Society of America.

Liquid Lenses Eye Commercial Breakthrough; Opto & Laser Europe, Nov. 2003.

Anderson, M.; Adaptive Optics: Liquid Crystals Lower the Cost of Adaptive Optics; Laser Focus World, Dec. 1999.

Davis, Roberta.; Computer Vision Syndrome—The Eyestrain Epidemic ; Review of Optometry, Sep. 15, 1997.

Lazarus, Stuart M.; The Use of Yoked Base-Up and Base-In Prism for Reducing Eye Strain at the Computer; Journal of the American Optometric Association, Apr. 1996.

Eyecare Business, Oct. 1997.

European Search Report for application No. EP 07 11 2473 dated Oct. 23, 2007.

PCT International Search Report for International Application No. PCT/US07/13743, completed on Nov. 29, 2007, 7 pages.

International Search Report for International Application No. PCT/US07/13743.

International Search Report for International Application No. PCT/US07/13600.

The European Search Report corresponding to the European 07 79 5943 application dated Dec. 16, 2009.

* cited by examiner

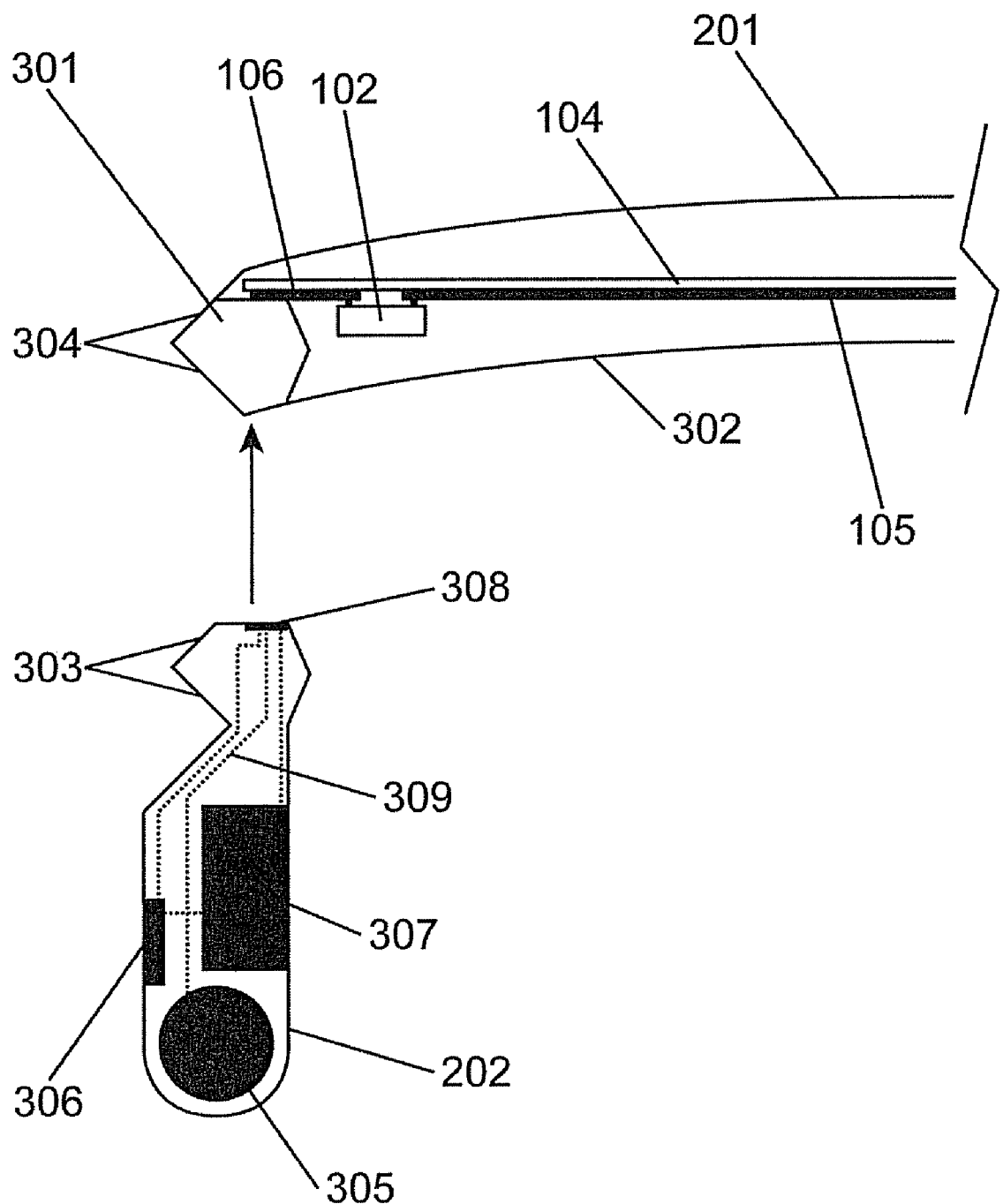

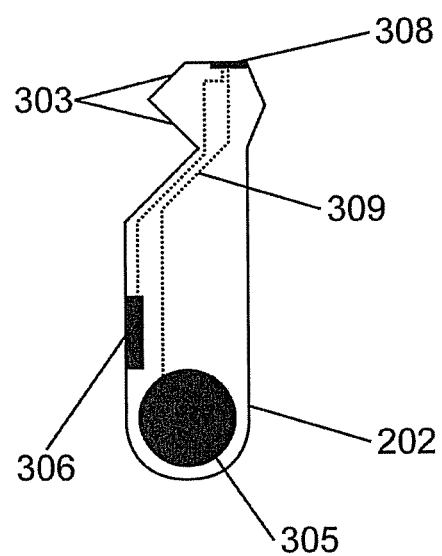 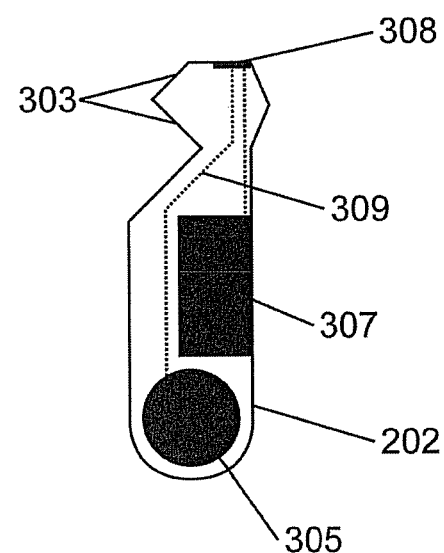
FIG. 3G  FIG. 3H

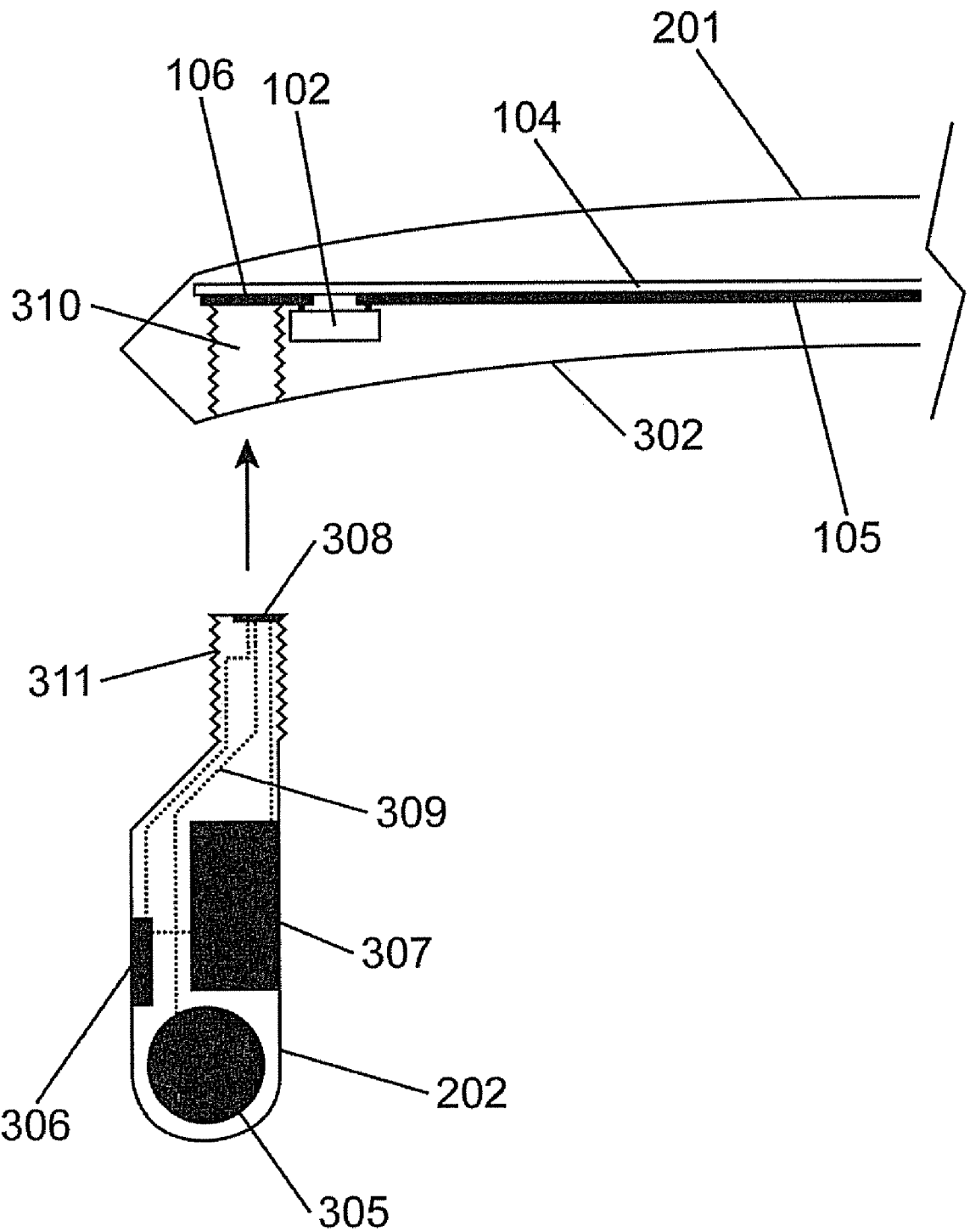

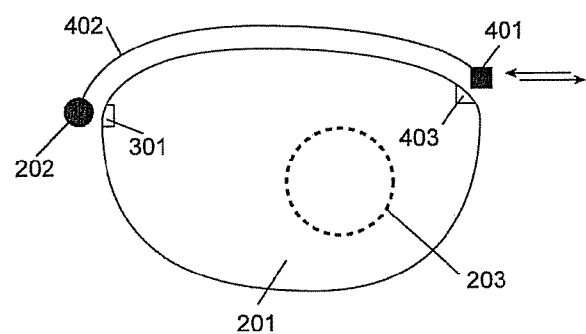
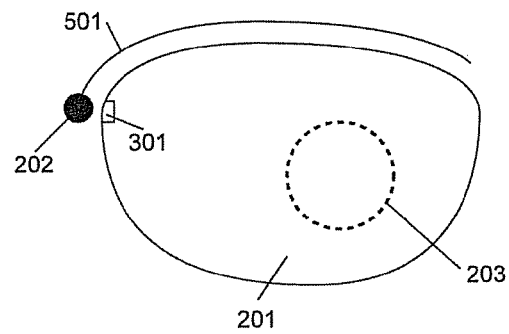
FIG. 4    FIG. 5
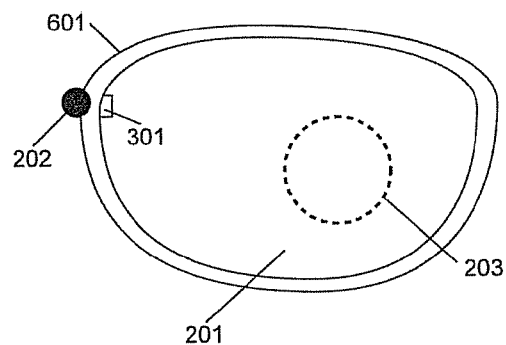
FIG. 6

ELECTRO-ACTIVE SPECTACLE LENSES

CROSS REFERENCE TO RELATED APPLICATIONS

This application is a continuation of U.S. application Ser. No. 11/808,555, filed on Jun. 11, 2007 now U.S. Pat. No. 7,527,375 (and entitled "Electronic Adapter For Electro-Active Spectacle Lenses"), which claims the benefit of Provisional Application U.S. Ser. No. 60/815,870, filed on Jun. 23, 2006, both of which are incorporated in their entirety herein by reference.

BACKGROUND OF THE INVENTION

1. Field of the Invention

The present invention generally relates to an adapter for a spectacle frame housing electro-active lenses. Specifically, this invention relates to an adapter configured for enabling a spectacle frame to operate and control electro-active lenses housed therein without the need to either uniquely design and manufacture the spectacle frame or to perform undue modifications of an existing spectacle frame. In particular, the spectacle frame may allow electro-active lenses housed therein to focus and be controlled both automatically and manually with heretofore unrealized results.

2. Description of the Related Art

With the invention of electro-active spectacle lenses that provide dynamic changes in focus there is a desire to engineer these lenses such that they can be compatible with most, if not all, pre-existing spectacle frame designs. To accomplish such a task, all of the components required to operate the electro-active functionality must be incorporated either internally or externally to the body of the lens so that the lens can be mounted into any unmodified spectacle frame and still be both aesthetically acceptable and fully functional.

Historically, the optical industry has been structured in such a way that the patient selects his or her eyewear based largely on aesthetics that relate to frame comfort and appearance. Generally the frames are the first item selected in picking out prescription eyeware. Lenses, including tints, coatings, and optical design are usually picked second. Given the significant number of available frame styles, sizes, and colors, the manner in which the industry has historically functioned, and the desire of the consumer or patient to have a vast selection of frames to choose from, there is a desire to provide a means and system for near universal compatibility between the new electro-active lenses and existing frame designs.

Accordingly, there is now provided with this invention an improved spectacle frame adapted for housing electro-active lenses that effectively overcomes the aforementioned difficulties and longstanding problems inherent in the art. These problems have been solved in a simple, convenient, and highly effective way by which to control electro-active lenses.

SUMMARY OF THE INVENTION

According to one aspect of the invention, an adapter for an electro-active lens is disclosed, wherein the electro-active lens is housed in a spectacle frame and the electro-active lens has a first set of electrical contacts. The adapter is a separate element from the electro-active lens and has a second set of electrical contacts for providing an electrical signal to the electro-active lens through the first set of electrical contacts.

As will be appreciated by those persons skilled in the art, a major advantage provided by the present invention is enabling a spectacle frame to operate and control electro-active lenses housed therein without the need to either uniquely design and manufacture the spectacle frame or to perform undue modifications of an existing spectacle frame. The spectacle frame may allow electro-active lenses housed therein to focus and be controlled both automatically and manually with heretofore unrealized results. Additional objects of the present invention will become apparent from the following description.

The method and apparatus of the present invention will be better understood by reference to the following detailed discussion of specific embodiments and the attached figures which illustrate and exemplify such embodiments.

DESCRIPTION OF THE DRAWINGS

A specific embodiment of the present invention will be described with reference to the following drawings, wherein:

FIG. 3A is a top view of the left temporal side of an embodiment of the electro-active spectacle lens of the present invention;

FIG. 3B is a top view of the top left temporal side of an embodiment of the adapter of the present invention;

FIG. 3G is a top view of the top left temporal side of another embodiment of the adapter of the present invention;

FIG. 3H is a top view of the top left temporal side of another embodiment of the adapter of the present invention;

FIG. 3I is a top view of the left temporal side of another embodiment of the electro-active spectacle lens of the present invention;

FIG. 3J is a top view of the top left temporal side of another embodiment of the adapter of the present invention;

FIG. 4 is a front view of an embodiment of the right side of the electro-active spectacle lens and adapter of the present invention;

FIG. 5 is a front view of another embodiment of the right side of the electro-active spectacle lens and adapter of the present invention; and FIG. 6 is a front view of another embodiment of the right side of the electro-active spectacle lens and adapter of the present invention.

DESCRIPTION OF THE PREFERRED EMBODIMENT

The following preferred embodiment as exemplified by the drawings is illustrative of the invention and is not intended to limit the invention as encompassed by the claims of this application.

Figure 1:
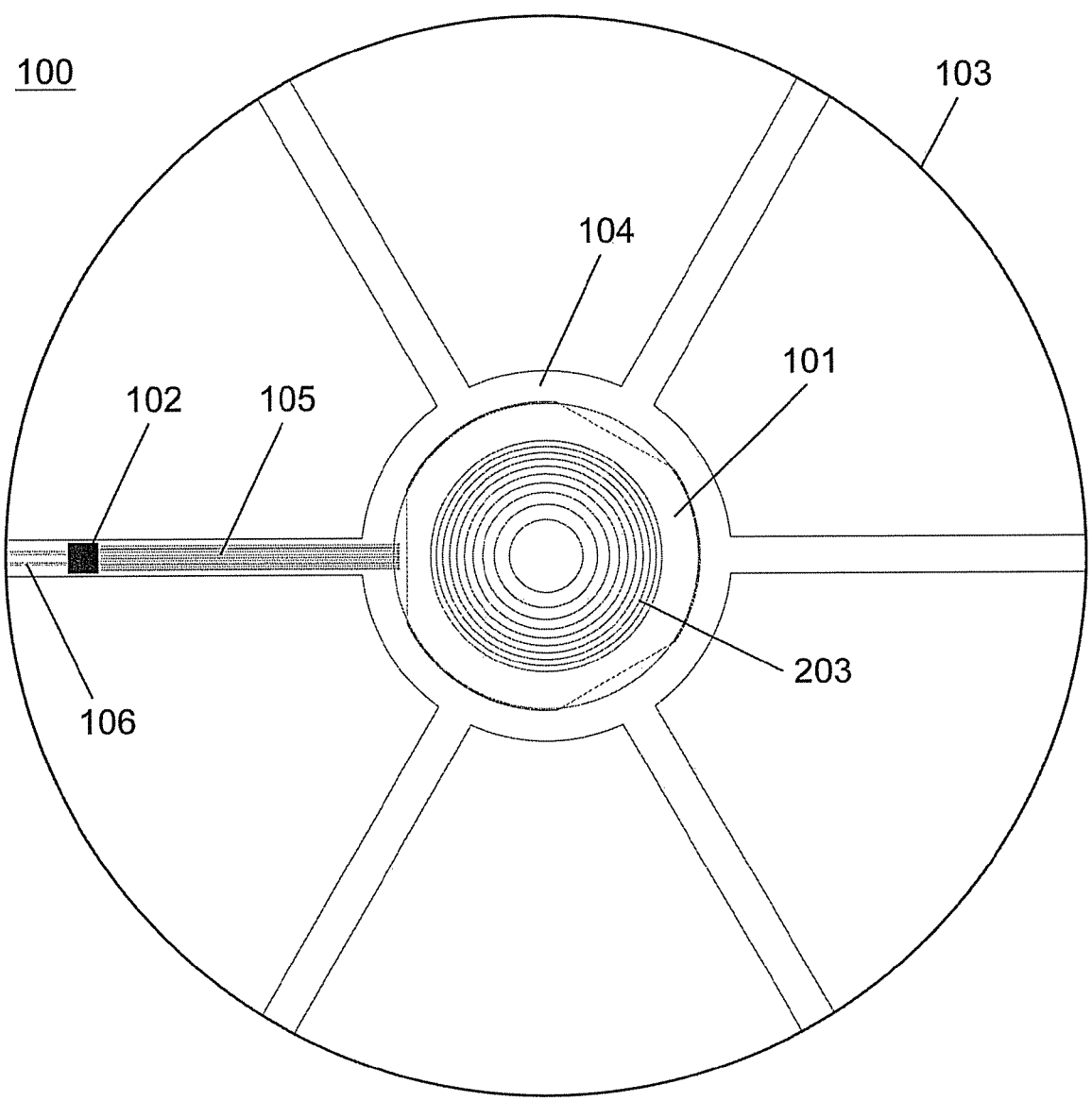
FIG. 1 is a diagrammatic representation of an example of an electro-active lens and its drive components.

As shown in FIG. 1, as in all embodiments of the present invention, the electro-active spectacle lenses 100 contain an electro-active lens element 101 and drive electronics, including one or more focus sensors 102, all of which are embedded within the body of a lens 103 that act to correct refractive errors of the eye not associated with presbyopia. The drive electronics are contained within a driver. The driver may also include all necessary control components for providing the appropriate electrical signal for providing the proper optical power in the electro-active lens. The body of the lens may be either a finished blank (two optical quality surfaces) or a semi-finished blank (one optical quality surface). The focus sensors, drive electronics, and electro-active lens element may be typically attached to the anterior and/or posterior surface of a flexible but transparent star shaped substrate 104 where electrical connection is made via thin film transparent electrical leads 105 (such as, by way of example only, indium tin oxide, ITO). These thin film transparent electrical leads include connections 106 for an electrical power source. These thin film transparent electrical leads may also include connections for digital or analog signal transfer. In certain other embodiments, the power source and signal connections may be of a different design where they are connected to the flexible substrate but contain non thin-film conductors, such as, by way of example only, fine gauge metal wire. This alternative design is such that the connection does not significantly interfere with the user's vision or the aesthetics of the lens. These power source and signal connections as well as the focus sensors and drive electronics are placed near the edge of the lens, near where the frame eye-wire and temple connect, such that when the lens is fitted within the frame, the power source, drive electronics, and focus sensors do not interfere with the vision of the user. Alternatively, the drive components may be placed distal from the electro-active lenses either in the spectacle frame, the temples, or in the adapter of the present invention.

Figure 2A:
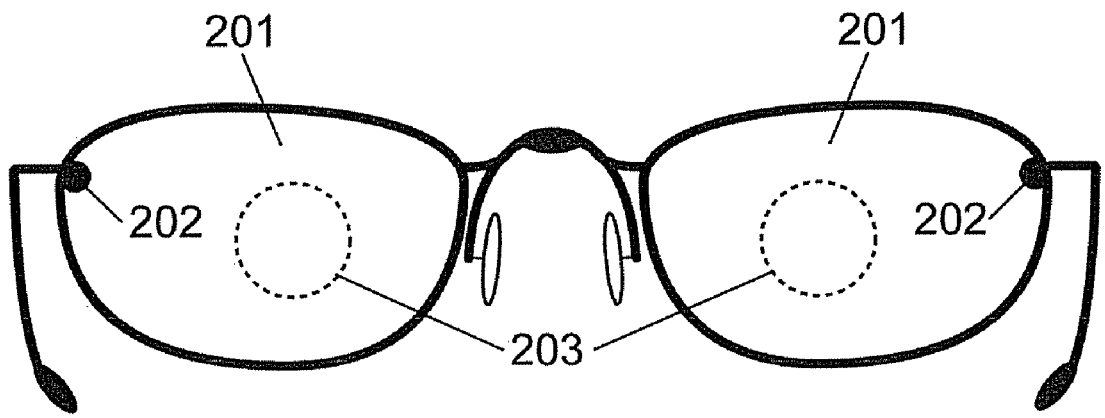
FIG. 2A is a front view of a spectacle frame housing the adapter of the present invention.
Figure 2B:
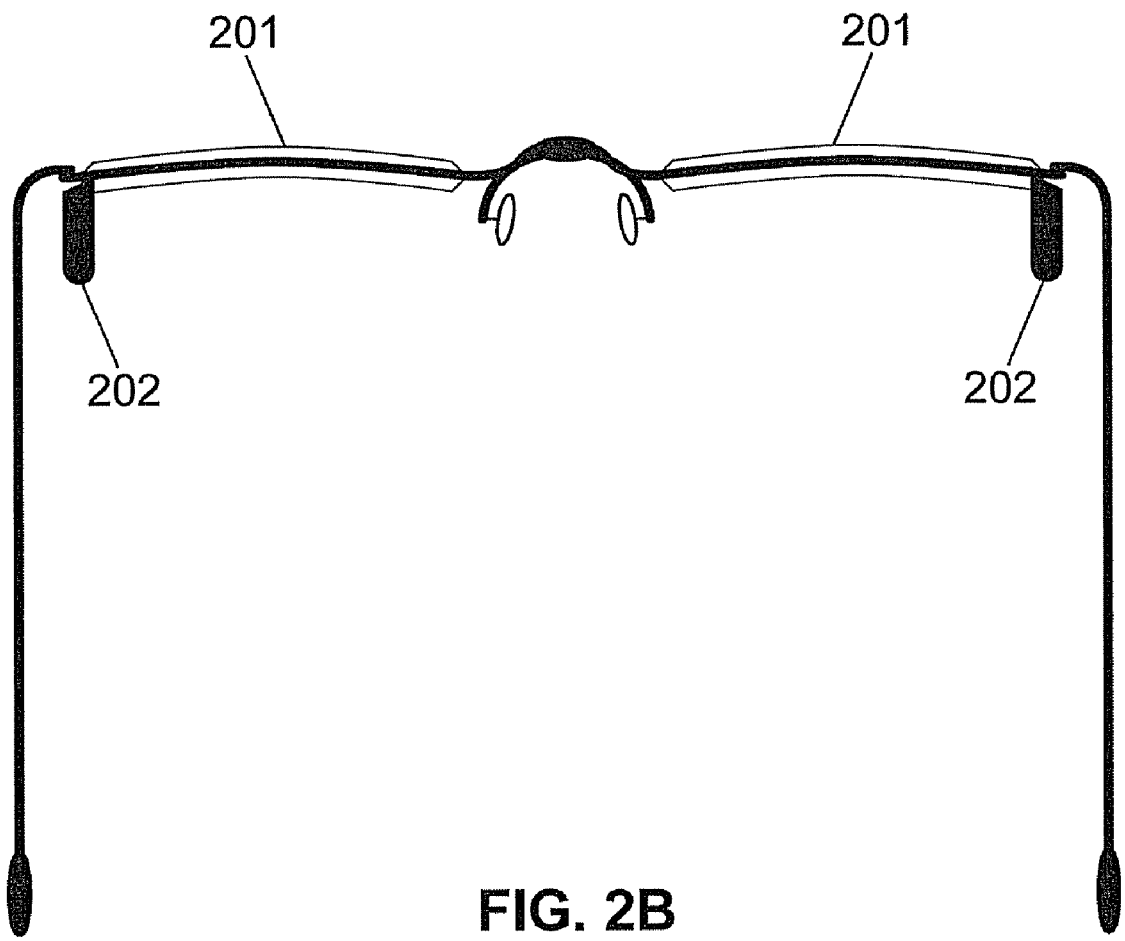
FIG. 2B is a top view of a spectacle frame housing the adapter of the present invention.

In an embodiment of the invention shown in FIG. 2, the electro-active lens 201 with electro-active region 203 is edged (cut to the shape of the spectacle frame) using techniques well known in the art. The process of edging the lens acts to either partially or fully expose the electrical leads that connect to the power source. This edged lens is then combined with an electrical adapter 202 that, as shown in FIG. 3B, may contain one or more electrical power sources 305, one or more electrical switches 306 to provide manual control of the lenses to the user, and one or more sensors 307 that acts to detect the presence of the user (determine if spectacles are being worn). As an alternative design, the sensor 307 may also include the drive electronics 102 for the electro-active lens. The sensor 307 may also sense if the frame is opened. This adapter has electrical contacts 308 that correspond to the power source and signal electrical contacts 106 in the lens 201 such that when the adapter is placed between the spectacle lens and the eye wire of the spectacle frame, the pressure associated with securing the lens within the frame acts to make positive electrical contact between the lens and the adapter as well as physically secure the adapter to the spectacles. Components within the adapter are connected electrically by means of internal wiring 309. Power sources included within the adapter may be, by way of example only, disposable zinc-air batteries or rechargeable Li-ion or Li-polymer batteries. Manual switches included within the adapter may be, by way of example only, pressure switches, capacitive touch switches or optical proximity switches. Sensors to determine if the spectacles are being worn may be, by way of example only, optical proximity switches or accelerometers which, if activated, instruct the drive electronics to operate the focus sensors within the body of the lens. In this embodiment each of the lenses would be identical and would each require an individual adapter. The driver may provide an electrical signal for generating the appropriate amount of optical power in each of the electro-active lenses. The driver may also include a focusing sensor for determining the appropriate signal for the electro-active lenses.

As also shown in FIGS. 3A-3J, the use of such an adapter 202 may require, in certain embodiments, other machining steps in addition to edging where, by way of example only, one or more of a slot, groove, or notch 301 is machined into the body of the lens 201 such that robust physical and electrical connection is made between the frame, lens, and adapter. As the adapter would be placed near to where the frame eye-wire and temple connect, such a machining step may allow the adapter to be located on the posterior surface 302 of the lens 201 and be mostly hidden from view by the temple hinge. Such a placement would be advantageous for preserving the aesthetic quality of the spectacles. It is preferable that the edge profile 303 of the adaptor 202 match that (304) of the lens 201 such that a secure fit is guaranteed between the frame, lens, and adapter.

Figure 3C:
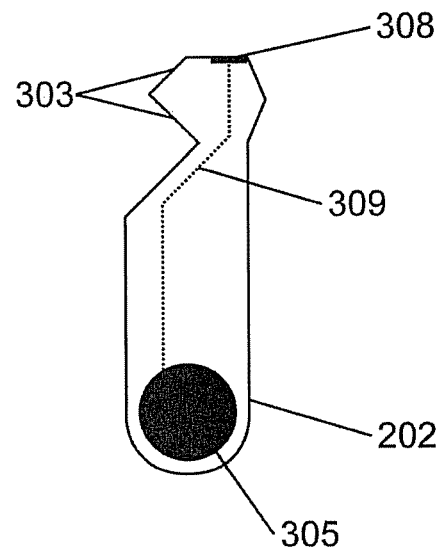
FIG. 3C is a top view of the top left temporal side of another embodiment of the adapter of the present invention.
Figure 3D:
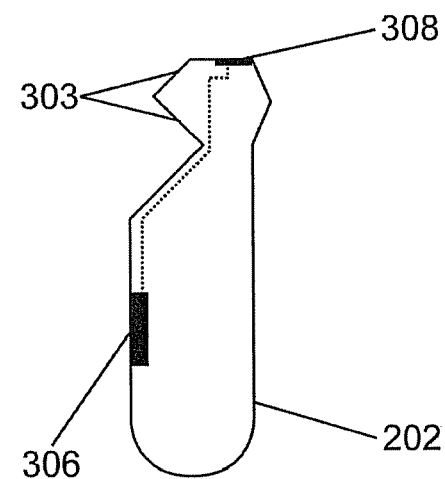
FIG. 3D is a top view of the top left temporal side of another embodiment of the adapter of the present invention.
Figure 3E:
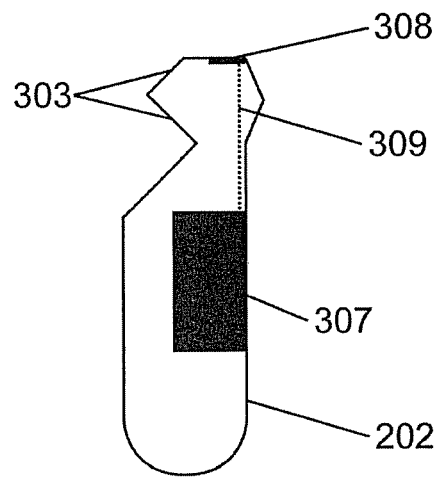
FIG. 3E is a top view of the top left temporal side of another embodiment of the adapter of the present invention.
Figure 3F:
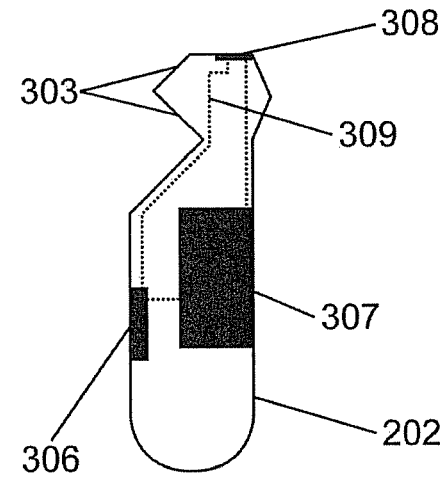
FIG. 3F is a top view of the top left temporal side of another embodiment of the adapter of the present invention.

Embodiments of the adapter of the present invention may contain any of a combination of components. For example, as shown in FIG. 3B, the adapter may have an on/off switch, a power source, and a sensor for sensing the presence of the user. Alternatively, as shown in FIG. 3C, the adapter may only have a power source. Alternatively, as shown in FIG. 3D, the adapter may only have an on/off switch. Alternatively, as shown in FIG. 3E, the adapter may only have a sensor for sensing the presence of the user. As shown in FIG. 3F, the adapter may have an on/off switch, and a sensor for sensing the presence of the user. As shown in FIG. 3G, the adapter may have an on/off switch, and a power source. As shown in FIG. 3H, the adapter may have a power source and a sensor for sensing the presence of the user.

As further illustrated in FIGS. 3I and 3J, the electrical connection made between the frame, lens, and adapter may include a physical connection in which mating elements between the lens and the adapter are screwed to one another. As shown, the adapter may include screw threads 311 which secure into mating threads 310 in the lens. Of course, as is well known in the art, such physical connections can further include a wide variety of equivalents, for example, a bayonet-type connection, a detent, snap-like connection and etc. As is also well known in the art, the electrical connection may be made with a wide variety of electrical mating elements, for example, male/female connectors, plugs, sockets, pins, and the like.

The adapter may be positioned so that it simultaneously contacts the lens and the frame or, alternatively, it may be positioned so that it only contacts the lens and does not contact the frame. The adapter may be positioned so that it is located under and above the surface of the lens when it is in contact therewith. The adapter may be further positioned so that it is located near a periphery of the surface of the lens when it is in contact therewith.

One issue with the above embodiments is that each lens operates independently from the other. Therefore, the possibility exists that under certain operational conditions one lens may be triggered to operate while the other is not. To eliminate this problem a means for synchronizing the operation of the two lenses must be devised such that when one of the two lenses is activated, the other will be activated by default. In another embodiment of the invention the electrical adapters of the two lenses are connected by means of discrete signal conduit such as, by way of example only, one or more of a small gauge metal wire or optical fiber. Such signal conduits could be hidden in the gap between the frame eye wire and the lens as well as behind the bridge that joins the two lenses.

In another embodiment the two lenses are synchronized by means of a wireless optical connection designed to transmit data across the bridge as shown in FIG. 4. In this embodiment an infrared optical transceiver unit 401 is tethered to each adapter 202 by means of a flex circuit 402, which may be hidden between the superior eye-wire of the frame and the edged electro-active spectacle lens 201. The transceiver unit is preferred to be located at the location of where the superior vertical distance of each eye-wire allows for the best, unhindered optical communication between the IR transceivers. As with the adapter, an additional machining step may be required where, by way of example only, one or more of a slot, groove, or notch 403 is machined into the body of the lens such that a robust physical connection is made between the transceiver unit and the spectacles. Furthermore, such machining steps would allow the transceiver unit to be mounted to either the anterior or posterior surface of the lens.

In another embodiment the two lenses are synchronized by means of a wireless, radio frequency (RF) communication system as shown in FIG. 5. In this embodiment the electrical adapter 202 contains circuitry for an RF transceiver that is tethered to a flex circuit antenna 501 (for example only). This flex circuit antenna may be hidden between the frame eye wire and the edged spectacle lens 201.

In another embodiment the two lenses are synchronized by means of inductive coupling as shown in FIG. 6. In this embodiment the electrical adapter 202 contains circuitry for a pulsed current source that is tethered to multiple-turn coils of an electrical conductor made using flex circuit 601 (for example only). These flex circuit coils may be hidden between the frame eye wire and the edged spectacle lens. In this approach, current pulses in the coils of lens 1 generates a magnetic field which, by way of Faraday's law of induction, generates a current in the coils of lens 2, which is then be detected by the circuitry of the electrical adapter of lens 2. In this manner communication between the two lenses is enabled.

In another embodiment, the two lenses may be synchronized by means of ultrasonic signals transmitted over free space. In this embodiment the electrical adapter contains circuitry for an ultrasonic transceiver. Such an approach is advantageous in that no additional components are required to be tethered to the electrical adapter.

In yet another embodiment, the two lenses may be synchronized by means of vibrations transmitted through the spectacle frame. In this embodiment the electrical adapter contains a vibration transducer and detector that makes physical contact to the frame when the lenses, adapters, and frames are assembled. Transducers and detectors of vibrations may be made from, by way of example only, piezoelectric materials. Such an approach is advantageous in that no additional components are required to be tethered to the electrical adapter.

In order to simplify any of the above embodiments, only one lens could be outfitted with one or more focus sensors and a synchronization transmitter while the other lens would not include any focus sensors and only a synchronization receiver. In such an embodiment the lens with the focus sensor(s) would operate as the "master" while the other lens would operate as the "slave" and only operate when directed by the master. Such a one-way communication system would reduce power consumption (by eliminating synchronization transmitters and a focus sensors) and simplify synchronization, but at the expense of eliminating redundancy in the focus sensors.

Although the particular embodiments shown and described above will prove to be useful in many applications in the spectacle art and the electro-active lens art to which the present invention pertains, further modifications of the present invention will occur to persons skilled in the art. All such modifications are deemed to be within the scope and spirit of the present invention as defined by the appended claims.

What is claimed is:

1. Spectacles, comprising:
   a spectacle frame;
   a first electro-active lens housed in the spectacle frame;
   a second electro-active lens housed in the spectacle frame; and
   a synchronization transmitter operably connected to at least one of the first electro-active lens and the second electro-active lens, wherein the synchronization transmitter is adapted to coordinate operation of the lenses, and wherein the first and second electro-active lenses are activated at substantially the same time.

2. The spectacles of claim 1, wherein the synchronization transmitter comprises an infrared (IR) transmitter.

3. The spectacles of claim 1, wherein the synchronization transmitter comprises a radio frequency (RF) transmitter.

4. The spectacles of claim 1, wherein the synchronization transmitter comprises a pulsed current source.

5. The spectacles of claim 1, further comprising:
   a frame eye wire of the spectacle frame;
   an edged spectacle lens wherein at least one of the first electro-active lens and the second electro-active lens is the edged spectacle lens; and
   a flexible circuit disposed between the frame eye wire and the edged spectacle lens. between the frame eye wire and the edged spectacle lens.

6. The spectacles of claim 1, wherein the synchronization transmitter comprises an ultrasonic transmitter.

7. The spectacles of claim 1, wherein the synchronization transmitter comprises a vibration transducer.

8. The spectacles of claim 1, wherein optical powers of the first and second electro-active lenses are changed from a first state to a second state, respectively, at substantially the same time.

9. The spectacles of claim 1, further comprising:
   a spectacle lens, wherein at least one of the first electro-active lens and second electro-active lens is the spectacle lens;
   an eye wire of the spectacle frame; and
   an adapter containing a power source, wherein the adapter is located between the spectacle lens and the eye wire of the spectacle frame.

10. The spectacles of claim 9, wherein the adapter is connected to electrical leads extending from one of the first and second electro-active lenses.

11. The spectacles of claim 10, wherein the electrical leads are exposed during edging.

12. The spectacles of claim 1, wherein the synchronization transmitter is connected to the first electro-active lens.

13. The spectacles of claim 12, further comprising a synchronization receiver operably connected to the second electro-active lens, wherein the synchronization receiver activates the second electro-active lens based on a signal received from the synchronization transmitter connected to the first electro-active lens.

14. The spectacles of claim 1, wherein the synchronization transmitter is connected to the first electro-active lens and the second electro-active lens.

15. The spectacles of claim 1, wherein the synchronization transmitter is connected to the second electro-active lens.

16. The spectacles of claim 15, further comprising a synchronization receiver operably connected to the first electro-active lens, wherein the synchronization receiver activates the first electro-active lens based on a signal received from the synchronization transmitter connected to the second electro-active lens.

17. The spectacles of claim 1, further comprising:
   an adapter containing a power source, and
   a frame eye wire of the spectacle frames; wherein the adapter is located near to where the frame eye-wire and temple connect.

18. The spectacles of claim 1, further comprising an adapter containing a power source, wherein the adapter simultaneously contacts one of the first and second electro-active lenses and the frame.

19. The spectacles of claim 1, further comprising an adapter containing a power source, wherein the adapter only contacts one of the first and second electro-active lenses and does not contact the frame.

20. The spectacles of claim 1, further comprising:
   a surface formed by the first electro-active lens; and
   an adapter containing a power source, wherein the adapter is located under and above the surface of the lens when it is in contact therewith.

21. The spectacles of claim 1, further comprising an adapter containing a power source, wherein the adapter is located near a periphery of a surface of one of the first and second electro-active lenses. when it is in contact therewith.

22. The spectacles of claim 1, wherein the first electro-active lens and the second electro-active lens are activated by application of an electrical signal.

* * * * *